United States Patent [19]
Wanat et al.

[11] Patent Number: 5,802,957
[45] Date of Patent: Sep. 8, 1998

[54] TOASTER SHADE CONTROL DISPLAY

[75] Inventors: David Wanat, Meriden; Roger Letso, Sandy Hook, both of Conn.

[73] Assignee: Conair Corporation, Stamford, Conn.

[21] Appl. No.: 892,956

[22] Filed: Jul. 16, 1997

[51] Int. Cl.⁶ .............................. A47J 37/08; H05B 1/02
[52] U.S. Cl. ..................... 99/327; 99/329 RT; 99/331; 99/342; 99/389; 99/391; 219/506; 219/521; 219/492; 219/494
[58] Field of Search ............... 99/326–333, 389–391, 99/385, 393, 400, 401, 342; 219/501, 506, 512, 514, 518, 492, 494, 497, 464, 398, 405, 408, 413

[56] References Cited

U.S. PATENT DOCUMENTS

| | | | |
|---|---|---|---|
| 3,585,365 | 6/1971 | Kircher | 219/512 |
| 3,636,858 | 1/1972 | Paaskesen | 99/335 |
| 3,684,860 | 8/1972 | Snyder | 99/329 R |
| 3,684,861 | 8/1972 | Remer | 99/393 X |
| 4,226,176 | 10/1980 | Macchi | 99/389 X |
| 4,345,145 | 8/1982 | Norwood | 219/492 |
| 4,487,115 | 12/1984 | Su | 99/327 |
| 4,894,518 | 1/1990 | Ishikawa et al. | 99/332 X |
| 5,088,389 | 2/1992 | Fresno | 99/327 |
| 5,128,521 | 7/1992 | Lanno | 219/492 X |
| 5,193,439 | 3/1993 | Finesman et al. | 99/327 |
| 5,414,243 | 5/1995 | Snell et al. | 219/492 |
| 5,426,280 | 6/1995 | Smith | 99/506 |

*Primary Examiner*—Timothy F. Simone
*Attorney, Agent, or Firm*—Ohlandt, Greeley, Ruggiero & Perle

[57] ABSTRACT

An improved toaster includes a user control panel for receiving and displaying user selections corresponding to a desired toast darkness setting. A toaster shade display displays a user selected toast darkness setting and includes a linear array of LEDs (LED bar), horizontally arranged on an exterior portion of the toaster body. The LEDs are sequentially turned on and off to indicate the user selected toast darkness setting, lighter or darker toast. The user control panel also contains preprogrammed custom settings for one-slice, two-slice, bagel, defrost and reheat mode of operation. A user can select a custom setting or any combination of custom settings thereof.

12 Claims, 6 Drawing Sheets

TOASTER SHADE CONTROL DISPLAY

FIELD OF THE INVENTION

The present invention relates to a toaster device and, more particularly, to a toaster control and display.

BACKGROUND OF THE INVENTION

It is known that conventional toasters provide a control display panel for indicating a level of toast darkness selected by a user. Such toasters have been known to utilize LEDs to form numerical values (i.e., 1, 2 . . . etc.) which represent a particular toaster setting or mode of operation. Such toaster display mechanisms are complex and costly.

Prior art toasters also provide a user control for toasting bread at different toast darkness levels. Quite often, when toasting slices of regular bread, the user must experiment at different darkness settings in order to toast bread at a desired darkness level. This problem becomes more prevalent when toasting breads of different densities (i.e., bagels, muffins, thick slices, different quantities of bread, . . . etc.). The user control mechanism of the prior art toasters is thus time consuming and cumbersome to operate.

Accordingly, it is an object of the invention to provide an improved toaster shade control display for indicating a user selected toast darkness.

It is a further object of the invention to provide an improved toaster which allows a user to toast bread at a toast darkness level.

Another object of the invention is to provide an improved toaster which provides a default setting for one slice and two slice operation.

SUMMARY OF THE INVENTION

An improved toaster includes a bread holder for holding slices of bread and a heater for toasting the slices of bread. A user control panel receives a user input corresponding to a desired toast darkness setting. A display includes a linear array of indicators, preferably an LED bar, for displaying the toast darkness setting. A processor unit, responsive to the user control panel, activates a selected, sequential number of indicators corresponding to the desired toast darkness setting.

The user control panel also provides a user with a variety of custom settings. The toaster has a default custom setting to toast two slices of regular bread to a medium brown color. The toaster also includes a one-slice setting to toast one slice of bread to a medium brown color, a defrost setting to toast frozen bread, a bagel setting to toast denser bread and a reheat setting to reheat toasted breaded. A user need only select a single custom setting or combination of custom settings to toast bread to a desired toast darkness.

The user control panel is further independently connected to a power source. In particular, the user control panel is coupled to a different AC/DC transformer, than the heater. The user control panel thus remains operative regardless of whether a toasting cycle is initiated. A user can select or change a toast darkness setting or custom setting at any time, i.e., before of after a toasting cycle has been initiated.

DETAILED DESCRIPTION OF THE INVENTION

Figure 1:
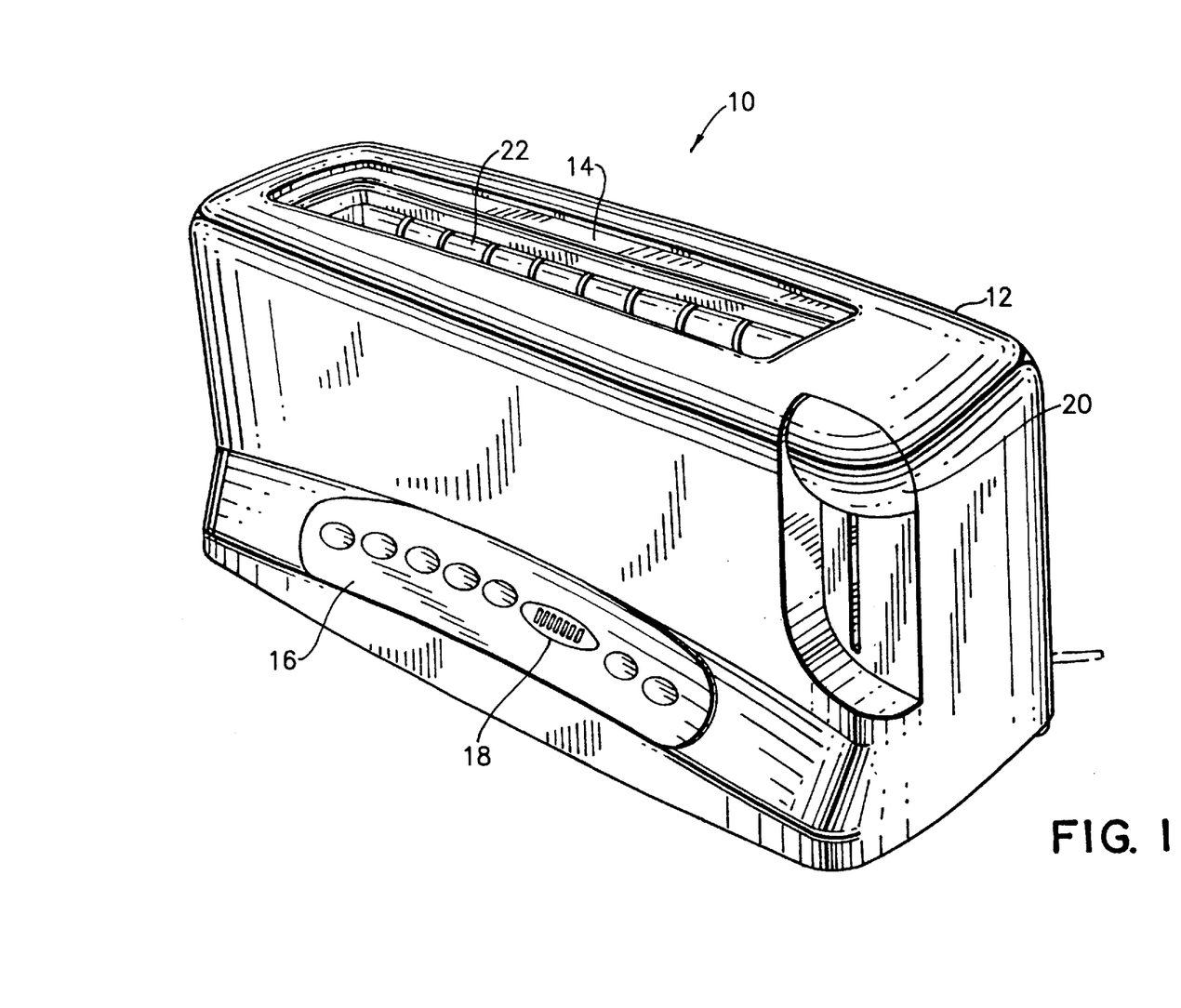
FIG. 1 illustrates a top perspective of a toaster in accordance with the present invention.
Figure 2:
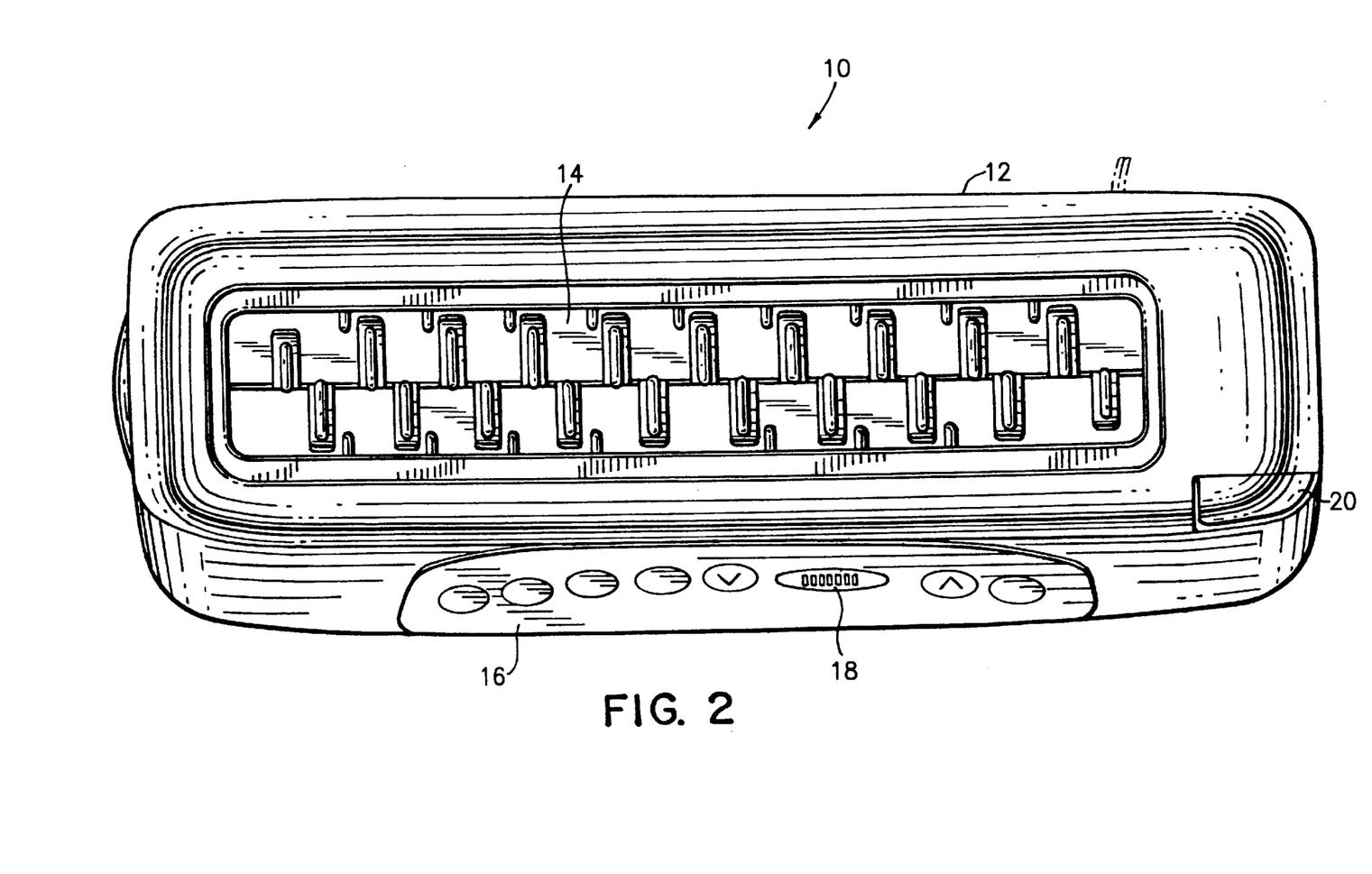
FIG. 2 illustrates a top plan view of the toaster.

Referring to FIGS. 1 and 2, a toaster 10 in accordance with the present invention has a box-like exterior body 12 which includes an opening 14, positioned on the top surface of body 12. Opening 14 allows slices of bread to be placed into a bread holder 22. A plurality of touch key pads and LEDs of a user control panel 16 are located on the exterior surface at one side of body 12. A user may select a toast darkness setting and custom settings, via touch keys; and such selections are displayed by the LEDs. A lever 20 enables the lowering of bread placed into bread holder 22 into a toasting chamber 30 and initiating a toasting cycle.

Figure 4:
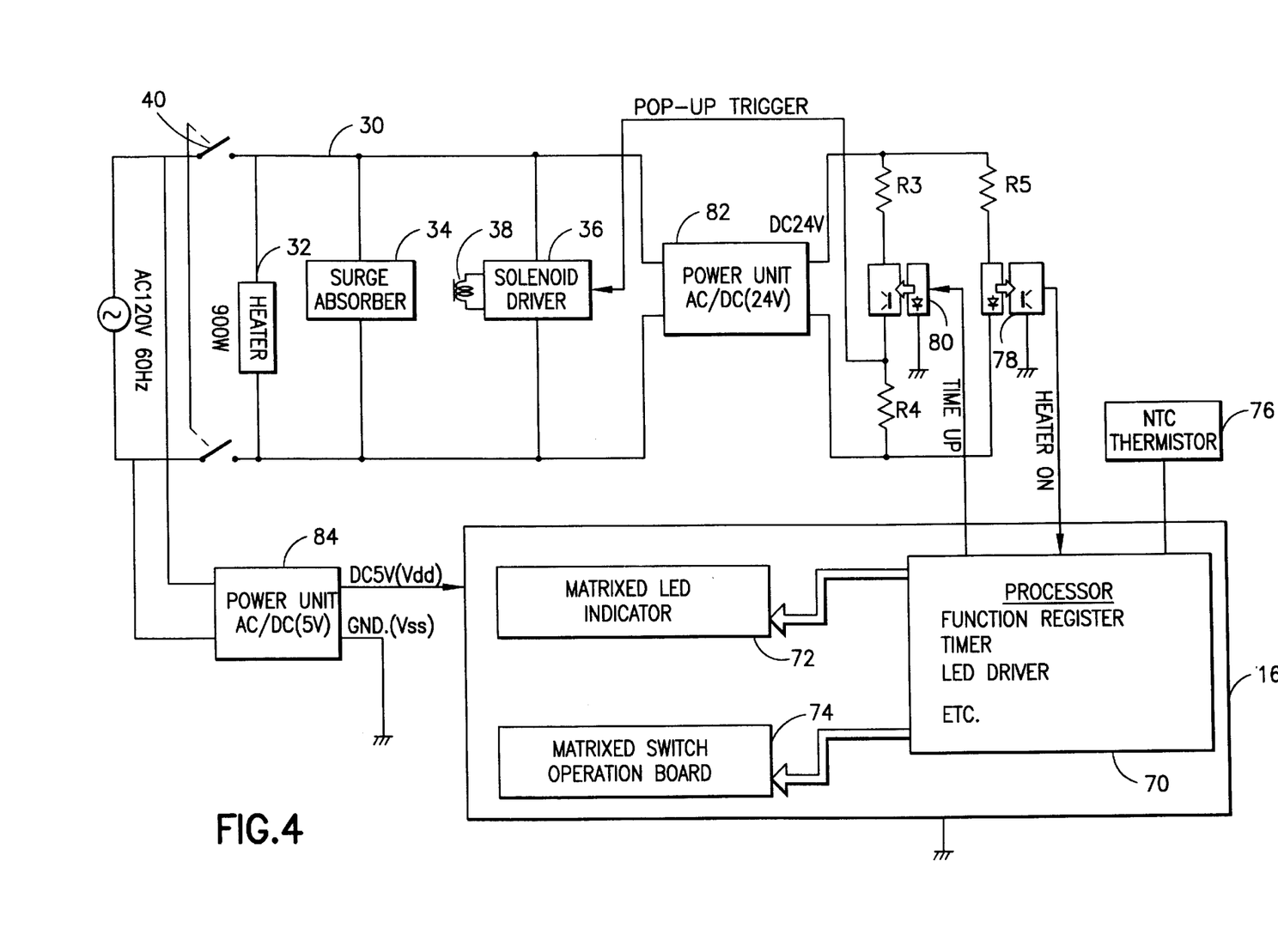
FIG. 4 illustrates a block diagram of the control components of a toaster in accordance with the present invention.
Figures 5, 5A:
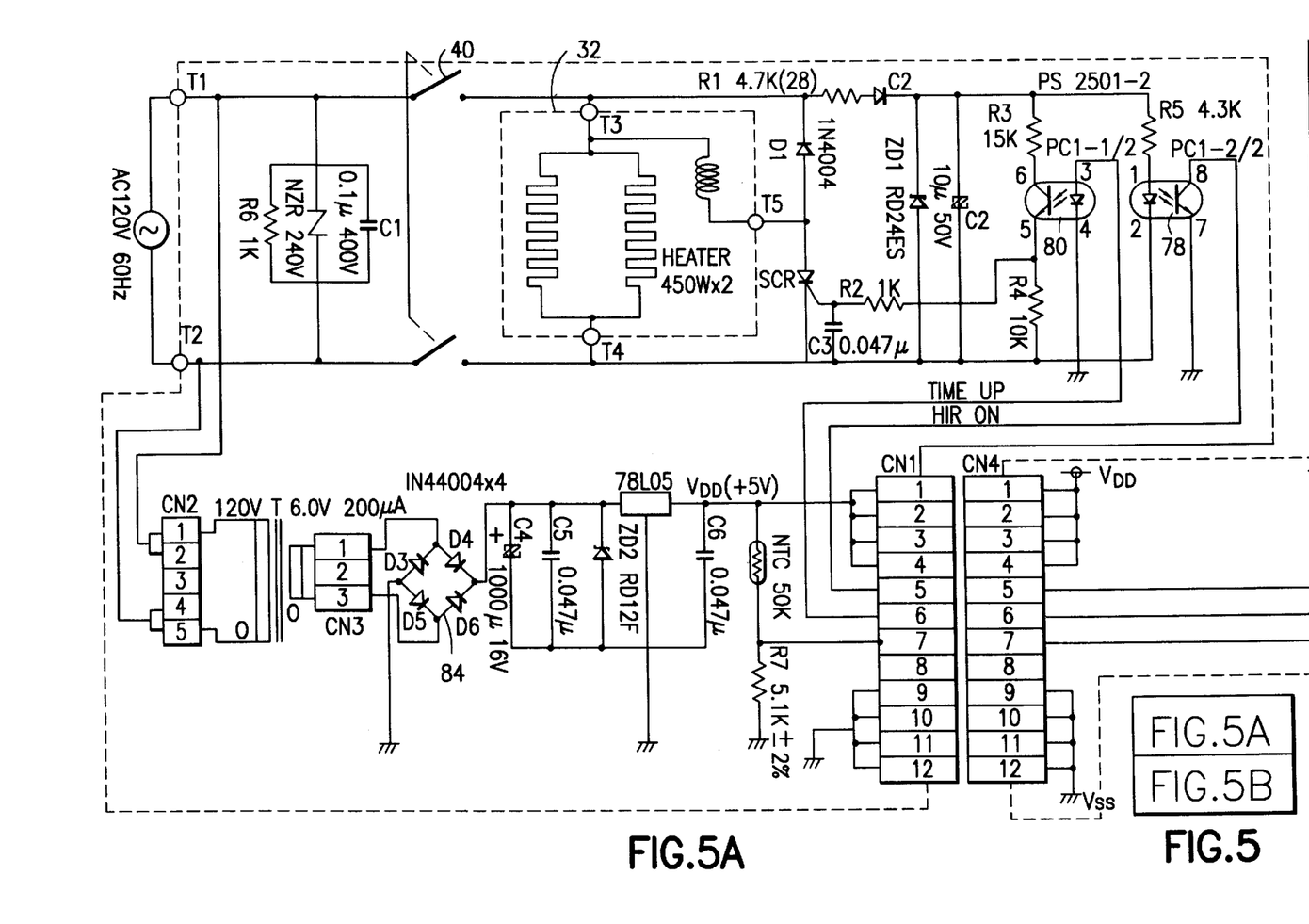
FIG. 5 illustrates a circuit diagram of toaster.
Figure 5B:
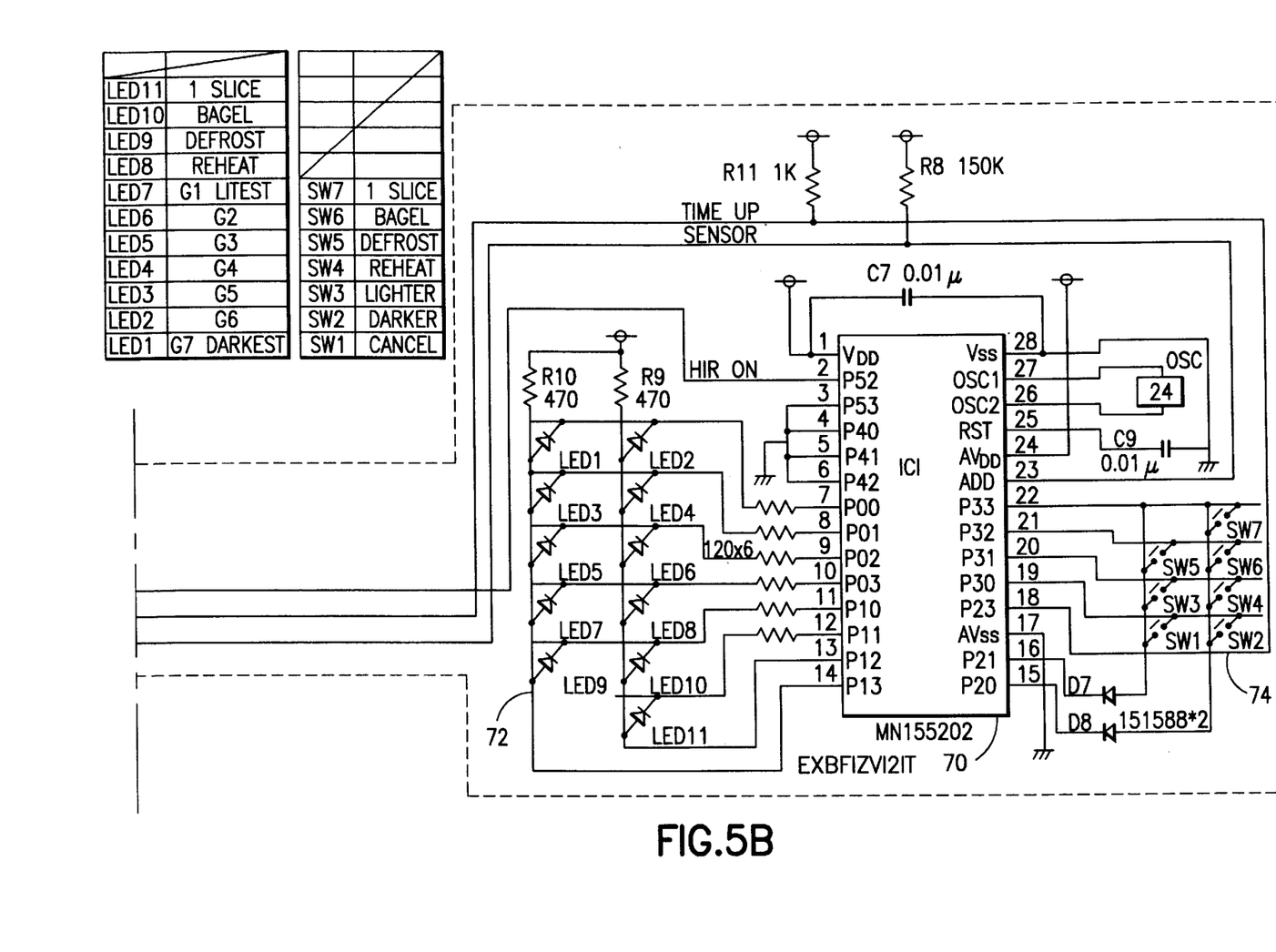

FIGS. 4 and 5 respectively illustrate a block diagram and a circuit diagram of the components of toaster 10. Toasting chamber 30 includes a heater 32, a surge absorber 34 and a solenoid driver 36 which controls a pop-up mechanism 38. Each of the aforementioned elements is coupled in parallel to an AC power supply across a dual-pole switch 40. When lever 20 (FIG. 1) is pressed to a down locked position, the bread in holder 22 is lowered into toasting chamber 30 and dual-pole switch 40 is closed. Heater 32 is activated, and a toasting cycle is initiated. After the toasting cycle is completed, solenoid driver 36 triggers pop-up mechanism 38. Pop-up mechanism 38 then releases lever 20, opens switch 40 and raises the toasted bread from toasting chamber 30.

As shown in FIGS. 4 and 5, user control panel 16 includes a processor unit 70 which is coupled to an operation board 74 having a plurality of switches (SW1 through SW7) and an indicator 72 having a plurality of LEDs (L1 through 11). Processor unit 70 includes at least a timer component for timing a toasting cycle, a LED driver for turning on or off the LEDs of indicator 72, and a function register for determining the length of a toasting cycle and selectively activating/deactivating the LEDs of indicator 72, based on user selections. Processor unit 70 receives control messages from the components of toasting chamber 30, via photo-coupler 78 and transmits control messages to the components of toasting chamber 30, via photo-coupler 80. Processor unit 70 receives user selections (i.e., custom setting and toaster darkness settings), via SW1 through SW7, and activates LEDs, LED1 through LED11, corresponding to the user selections (FIG. 5). Processor unit 70 determines a length of the toasting cycle based on the user selections, detects the initiation of a toasting cycle (i.e., lever 20 is locked in the down position) and terminates a toasting cycle after the determined length of the toasting cycle has elapsed.

Note that processor unit 70 is also coupled to a thermal sensor (FIG. 4), preferably a thermistor 76, positioned at or around toasting chamber 30, to sense the temperature of toasting chamber 30. During a toasting cycle, the varying temperatures of toasting chamber 30 may affect the ability of toaster 10 to toast bread to a user desired toast darkness. As a remedy, processor unit 70 utilizes the temperature information gathered from thermistor 76 to adjust the length of the toasting cycle or, in other words, to compensate for the varying temperature in toasting chamber 30. For instance, if the temperature in toasting chamber 30 is greater than a predetermined temperature or temperature range, processor unit 70 decreases the length of the toasting cycle. Likewise, if the temperature in toasting chamber 30 is less than a predetermined temperature or temperature range, processor unit 70 increases the length of the toasting cycle. As a result, bread will always be toasted to a desired toast darkness corresponding to the user selections.

Photo-couplers 78, 80 (FIGS. 4 and 5) are powered by a first AC/DC transformer 82 which is coupled to AC power supply across dual-pole switch 40. Photo-couplers 78, 80 provide an interface between processor unit 70 and the components of toasting chamber 30. Processor unit 70 receives a heater-on signal, via photo-coupler 78, when lever 20 is pressed to the lock position and the toasting cycle is initiated. In particular, when lever 20 is locked to the down position, dual-pole switch 40 is closed and the AC power supply becomes coupled to AC/DC transformer 82. A voltage is then supplied across a resistor R5 and photo-coupler 78, coupled in series. The voltage across resistor R5 and photo-coupler 78 causes current to flow through photo-coupler 78 to processor unit 70. The current flow through photo-coupler 78 (heater-on signal) is detected by processor unit 70.

It is important to understand that the current flow through photo-coupler 78 (heater-on signal) indicates to processor unit 70 that a toasting cycle has been initiated by the user. In response to the heater-on signal, processor unit 70 initiates the timer component to track a period of time corresponding to the determined length of the toasting cycle (based on the user selections). The timer component can be an up-down counter, a mechanical timer or any other mechanism that is capable of keeping track of a specified amount of time. Timer components are well-known in the art and will not be described in detail herein.

When the period of the toasting cycle has elapsed, processor 70 transmits a time-up signal to solenoid driver 36, via photo-coupler 80. In response to the time-up signal, solenoid driver 36 triggers pop-up mechanism 38 which raises lever 20 and opens dual-pole switch 40.

Figure 3:
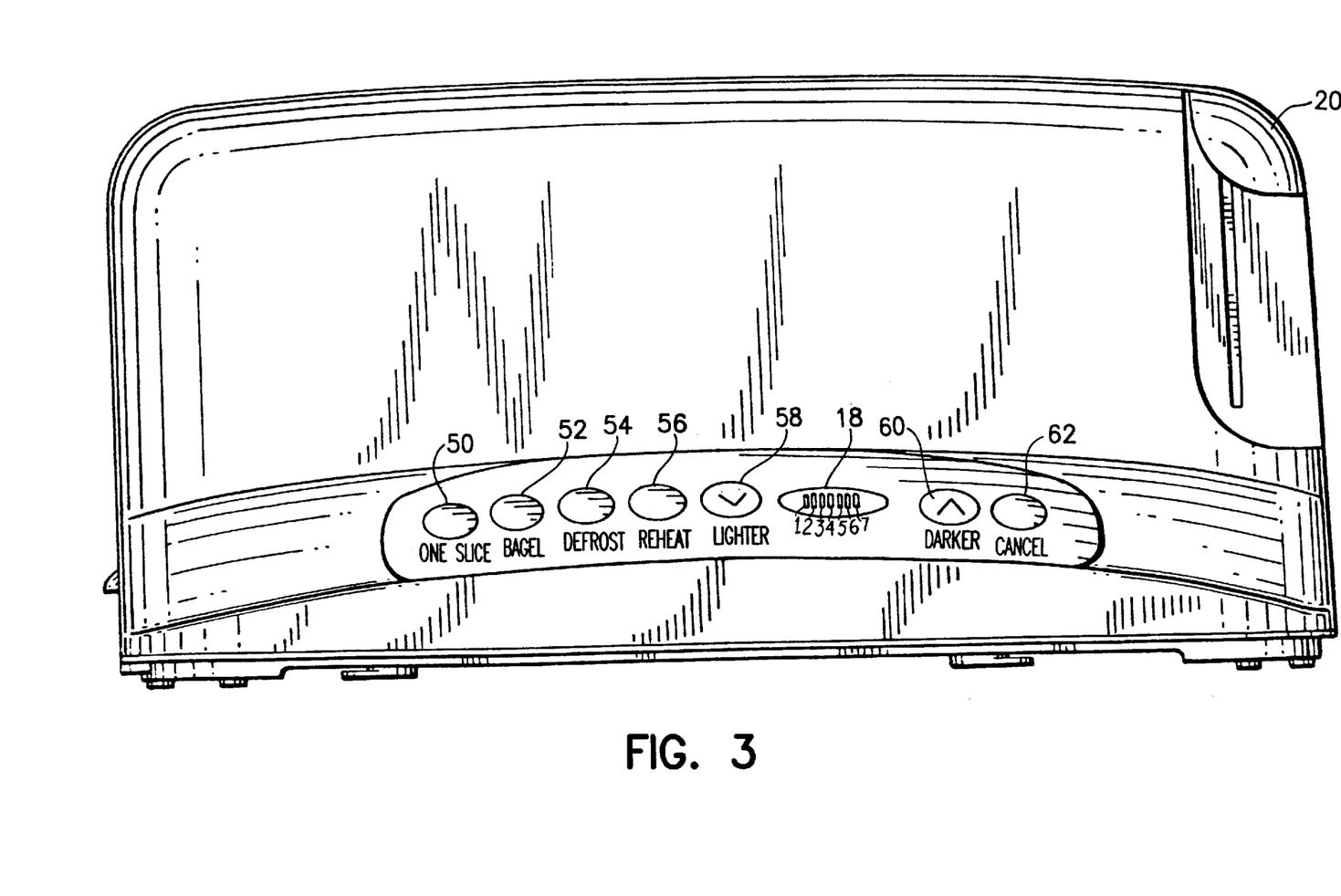
FIG. 3 illustrates a front elevated view and user control panel and a toaster shade display of the toaster in accordance with the present invention.

Referring to FIG. 3, user control panel 16 includes touch key pads for receiving a user input and transmitting the user input to a processor unit 70. A user can select a combination of predetermined operation modes (i.e., a custom settings) and toast darkness levels, by pressing the appropriate touch key pad or combination of touch key pads. Each touch key pad triggers a corresponding switch SW1 through SW7 on operation board 74 (FIG. 5) and relays a message to processor unit 70 that a particular custom setting or toast darkness level has been selected or deselected by the user. From the user selections, processor unit 70 determines the length of the toasting cycle and turns on or off LEDs corresponding to the selected custom settings and toast darkness levels through the LED driver.

Referring to FIGS. 3 and 5, it is preferred that user control panel 16 includes four touch keys 50, 52, 54 and 56 which activate/deactivate respective switches SW7, SW6, SW5 and SW4. Touch keys 50, 52, 54 and 56 (FIG. 3) correspond to the following custom settings: (1) a One-slice setting (touch key 50), (2) Bagel setting (touch key 52), (3) Defrost setting (touch key 54) and (4) Reheat setting (touch key 56). Absent a user input, processor unit 70 is automatically set to a default custom setting for toasting two slices of regular bread. That is to say, processor unit 70 sets the length of the toasting cycle to a predetermined period (i.e., default cycle) for toasting two slices of regular bread to a golden brown. A user may select a single custom setting or a combination of custom settings.

(1) One-Slice Setting. One slice of bread requires less time to toast than two slices of bread. By pressing touch key 50, processor unit 70 activates LED11 and adjusts the length of the toasting cycle by subtracting a determined amount of time from the toasting cycle for two slices of regular bread. This is true with bagels, muffins and English Muffins as well as regular toasted bread. The extra time is subtracted from the toasting cycle at any toast darkness setting to provide the same toast darkness for one slice of regular bread as would be provided for two-slices of regular bread.

(2) Bagel Setting. Pressing touch key 52 causes processor unit 70 to activate LED10 and to add an amount of time to the toasting cycle for normal two-slice bread (i.e., default setting). Bagels have greater density than regular slices of bread and, thus, require more toasting time. This is true regardless of the toast darkness setting selected whether light, medium or dark. The additional time is added to the toasting cycle at any toast darkness setting selected to give the user the same toast darkness on a bagel as would be provided for two-slices of regular bread. Although the bagel setting is employed for toasting bagels, it can also be used when toasting English Muffins, thick toast, corn or bran muffins or bread-like foods that require a toasting time similar to a bagel.

(3) Defrost Setting. Pressing touch key 54 causes processor unit 70 to activate LED9 and to add a determined amount of time to the toasting cycle for regular two-slice bread. The defrost setting provides the additional time to allow frozen bread slices to be defrosted and then toasted. It is preferred that the time added to the toasting cycle is approximately 30 percent (+/−5 percent) of the time of the toasting cycle.

(4) Reheat Setting. The Reheat button may be used to reheat toasted bread, bagel, muffins, . . . etc. in the toasting chamber without additional browning or toasting. By pressing touch key 56, processor unit 70 activates LED8 and sets the toasting cycle to a predetermined time appropriate for reheating toasted bread, bagel, muffins, . . . etc. It is preferred that the toasting cycle for a reheat operation mode is 30 seconds.

Table I is provided below to explain the possible combination of custom settings available to the user and their corresponding toasting cycle.

TABLE I

| COMBINATIONS OF CUSTOM SETTINGS | USER INPUT | TOASTING CYCLE (PROCESSOR DETERMINED TIME PERIOD) |
|---|---|---|
| Two-Slice Default | None (Default Setting) | default cycle (i.e., predetermined time period) |
| Two-Slice Default & Defrost | Press Touch Key 54 | default cycle plus defrost time |
| Two-Slice Default & Bagel | Press Touch Key 52 | default cycle plus bagel time |
| Two-Slice Default & Reheat | Press Touch Key 56 | Sets toasting cycle to a reheat time, preferably 30 seconds |
| Two-Slice Default & Defrost & Reheat | Press Touch Keys 54 and 56 | default cycle plus defrost time and bagel time |
| One-Slice | Press Touch Key 50 | default cycle minus one-slice time |
| One-Slice & Defrost | Press Touch Keys 50 and 54 | default cycle minus one-slice time and plus defrost time |
| One-Slice & Bagel | Press Touch Keys 50 and 52 | default cycle minus one-slice time and plus bagel time |
| One-Slice & Reheat | Press Touch Keys 50 and 56 | Set toasting cycle to a reheat time, preferably 30 seconds |
| One-Slice & Defrost & Bagel | Press Touch Keys 50, 54 and 52 | default cycle minus one slice time, plus defrost time and plus bagel time |

As shown in Table I, for all custom settings except for Reheat, processor unit 70 determines the length of the toasting cycle by adding or subtracting an appropriate time from the default cycle for two-slices of regular bread. Although only four custom setting keys are shown in FIG. 3, toaster 10 may include additional custom settings and keys.

User control panel 16 further includes a cancel button, i.e., touch key 62, which resets all settings to the default settings and terminates an in-progress toasting cycle. Pressing touch key 62 closes a switch SW1. Processor unit 70 detects the closed switch SW1 and returns toaster shade display and control to the default setting (medium brown toast), resets the custom settings to the default setting for two-slices of regular bread, turns off all the activated LEDs for the custom settings and interrupts an in-progress toasting cycle.

User control panel 16 further includes a toaster shade control which allows a user to select a desired toast darkness setting. Toaster shade control includes a touch key 58 for a lighter toast setting and a touch key 60 for a darker toast setting. As with selecting a custom setting or combination of custom settings, the selection of a desired toast darkness, i.e., lighter or darker, increases or decreases the length of the toasting cycle. Pressing a lighter touch key 58 closes a switch SW3 and causes processor unit 70 to adjust the toaster to a lighter setting by shortening the length of toasting cycle; pressing darker touch key 60 closes a switch SW2 and causes processor unit 70 to adjust the toaster 10 to a darker setting by lengthening the toast cycle. Each time either touch keys 58, 60 are pressed, the toast darkness setting is increased or decreased respectively by one toast darkness setting.

A toast darkness selection entered by the user is stored in memory for future use, i.e., a subsequent toaster operation. A user may change the stored toast darkness setting by pressing cancel button 62 which resets the toast darkness setting to a default setting (i.e., medium brown), entering a new toast darkness setting with the lighter touch key 58 or darker touch key 60 or disconnecting the AC power supply from toaster 10 (i.e., unplugging the toaster from the AC power supply).

Referring to FIGS. 3, 4 and 5, toaster shade display 18 includes a linear array of LEDs (LED Bar) that indicate a current toast darkness setting. It is preferred that toaster shade display 18 employs seven LEDs, denoted LED1 through LED7, arranged horizontally along a line. The seven LEDs correspond to seven possible toast darkness settings or levels, as set forth below:

| Desired Toast Darkness | LED Light Position |
| --- | --- |
| Light | Setting 1 or 2 |
| Medium | Setting 3, 4 or 5 |
| Dark | Setting 6 or 7 |

At the lightest setting 1, only the furthermost left LED light is turned on. As the toast darkness is increased by pressing darker touch key 60, the LED bar grows longer to the right. That is to say, a new LED light is sequentially activated each time darker touch key 60 is pressed, until the LED bar has all seven LED lights turned on (corresponding to the darkest setting 7). The lighting process can be reversed by pressing lighter touch key 58 which sequentially turns off an LED light from right to left each time lighter touch key 58 is pressed.

If no user selection is entered, the toast darkness setting is automatically set to the default toast darkness setting 4 (i.e., medium brown toast) and the four leftmost LED lights are activated. Toast shade display 64 will always indicate the toast darkness selection currently stored.

It is important to understand that user control panel 16, as described above, utilizes a separate power source than the components of toasting chamber 30 and, thus, remains operative regardless of whether start lever 20 is in the down locked position (i.e., regardless of whether a toasting cycle is initiated). Specifically, a second AC/DC transformer 84, coupled directly to the AC power supply, transforms the AC Voltage from the AC power supply to DC voltage and supplies a constant DC source of voltage to operate user control panel 16. User control panel 16 thus remains operative so long as the AC power supply is connected to second AC/DC transformer 84, i.e., so long as toaster 10 remains plugged into the AC power supply. As such, a user can select or change custom settings and/or toast darkness settings at any time (i.e., before or after a toasting cycle has been initiated).

The operation of toaster 10 will now be described. A user initially inserts a single slice or two slices of bread into holder 22, via opening 14. If desired, the user can input a desired toast darkness setting by pressing lighter touch key 58 or darker touch key 60 which, in turn, causes processor unit 70 to turn on a sequential number of LEDs of indicator 72 corresponding to the selected toast darkness setting. Note that toaster 10 will automatically be set to a default toast darkness setting (i.e., setting 4) or the previous toast darkness setting retained in memory, unless a user enters a new toast darkness selection.

The user can also select a custom setting or a combination of custom settings (i.e., two-slice, one-slice, reheat, defrost and bagel) by pressing the appropriate combination of touch keys 50, 52, 54 and 56. If both the one-slice setting (touch key 50) or the reheat setting (touch key 56) are not selected, toaster 10 will toast the bread in holder 22 based at least on a default setting for two-slices of regular toast.

Depending on the selected custom settings and toast darkness settings, processor unit 70 determines a length of the toasting cycle that corresponds to the user selection. For instance, if reheat is selected, processor unit 70 sets the length of the toasting cycle to 30 seconds (see TABLE I). If defrost is selected, processor unit 70 adds an additional "defrost time" to the default cycle for two slices of regular bread. The above Table I provides an example of how processor unit 70 determines the toasting cycle with regard to the different combinations of custom settings. With respect to toast darkness settings, if a lighter or darker toast darkness setting is selected, processor unit 70 respectively subtracts or adds a pre-determined time to the toasting cycle.

After the desired settings have been selected, a toasting cycle can then be initiated by pressing lever 20 downwards until it locks into the down position. That is to say, pressing lever 20 into the down position lowers the bread into toasting chamber 30 and closes dual-pole switch 40 which, in turn, activates the toasting components, namely heater 32, of toasting chamber 30.

Once dual-pole switch 40 is in the closed position, AC/DC transformer 82 transforms AC voltage from the AC power supply to direct voltage, preferably 24 volts, which is supplied to photo-coupler 78 and resistor R5. Processor unit 70 detects the current flow through photo-coupler 78 (heater-on signal) and activates the timer component. The timer component is set to a time period corresponding to the calculated length of the toasting cycle based on the user selections.

During the toasting cycle, processor unit 70 monitors the temperature in toasting chamber, via thermistor 76, and adjusts the length of the toasting cycle accordingly in order to toast bread at the user selected settings. At any time during the toast cycle, a user may also change the original selections, custom settings and/or toast darkness settings. Accordingly, processor unit 70 will adjust the length of the toasting cycle to toast the bread at the new setting.

After a period corresponding to the determined length of the toasting cycle has elapsed, processor unit 70 terminates the toasting cycle by transmitting a time-up signal (i.e., a current) to photo-coupler 80, which, in turn, causes current to flow through solenoid driver 36. Solenoid driver 36 then triggers pop-up mechanism 38 which releases or unlocks lever 20 from the down position. As the lever is released, the toasted bread is raised out of toasting chamber 30, dual-pole switch 40 is opened and heater 32 is deactivated.

After a completed toasting cycle, any custom settings selected by the user are deselected and their corresponding LEDs are turned off. Toaster 10 is reset to the default setting for two-slices of regular bread. However, the selected toast darkness setting remains in memory for future use or until a new toast darkness is selected, the cancel button is pressed or the AC power supply is disconnected.

The invention having thus described with particular reference to the preferred forms thereof, it will be obvious that various changes and modifications may be made therein without departing from the spirit and scope of the invention as defined in the appended claims.

We claim:

1. A toaster for toasting bread to a desired darkness, said toaster comprising:

heater means for toasting bread; and control means including:

(i) input means for receiving a user input corresponding to a desired toast darkness;

(ii) display means comprising a linear array of indicators; and (iii) processor means:

(a) for causing said heater means to toast said bread to said desired toast darkness, and (b) responsive to said input means, for activating a selected, sequential number of said indicators corresponding to said desired toast darkness.

2. A toaster as recited in claim 1, wherein said indicators comprise a plurality of light emitting diodes.

3. A toaster as recited in claim 1, wherein said processor means, upon connection to a power source, activates a determined number of indicators corresponding to a default toast darkness.

4. A toaster as recited in claim 1, wherein said processor means causes said display means to display said sequential, selected number of indicators, until said input means receives a new user input corresponding to a different desired toast darkness.

5. A toaster as recited in claim 1, wherein said control means further comprises memory means for storing a current desired toast darkness.

6. A toaster as recited in claim 1, wherein said control means is independently coupled from said heater means to a power source.

7. A toaster for toasting bread at a desired toaster setting corresponding to a user selection, wherein a user can select from a plurality of custom settings, said toaster comprising:

heater means for generating heat over a toasting cycle corresponding to a length of time;

lever means for activating said heater means and initiating a toasting cycle; and control means including:

(i) input means for receiving a user input corresponding to a single custom setting or combination of custom settings; and (ii) processor means, responsive to said user input, for determining said length of time based on said user input, wherein said processor means, responsive to said lever means, causes said heater means to generate heat over said length of time.

8. A toaster as recited in claim 7, wherein said processor means sets said length of time to a default time value, corresponding to a two slice setting, upon a connection to said power source.

9. A toaster as recited in claim 7, wherein said processor means resets said length of time to a default time value, corresponding to a two-slice setting, after a termination of a toasting cycle.

10. A toaster as recited in claim 1, wherein said custom settings include a one-slice setting for toasting said amount of bread corresponding to one slice of bread.

11. A toaster as recited in claim 7, wherein said custom toaster settings include a bagel setting for toasting said amount of bread having a greater density than an average amount of bread.

12. A toaster as recited in claim 7, further comprising a thermal sensor, coupled to said processor means, for sensing a temperature in said holder means, wherein said processor means, during a toasting cycle, adjusts said length of time based on said temperature in said holder means.

\* \* \* \* \*